US012762063B2

(12) United States Patent
Qiu et al.

(10) Patent No.: US 12,762,063 B2
(45) Date of Patent: Oct. 13, 2026

(54) DATA PROCESSING SYSTEM AND METHOD, AND MEDIUM

(71) Applicant: IEIT SYSTEMS CO., LTD., Jinan (CN)

(72) Inventors: Zhiyong Qiu, Jinan (CN); Zhenhua Guo, Jinan (CN); Ruidong Yan, Jinan (CN); Yaqian Zhao, Jinan (CN); Rengang Li, Jinan (CN)

(73) Assignee: IEIT SYSTEMS CO., LTD., Jinan (CN)

( * ) Notice: Subject to any disclaimer, the term of this patent is extended or adjusted under 35 U.S.C. 154(b) by 0 days.

(21) Appl. No.: 19/168,731

(22) PCT Filed: Dec. 2, 2024

(86) PCT No.: PCT/CN2024/136221
§ 371 (c)(1),
(2) Date: Sep. 24, 2025

(87) PCT Pub. No.: WO2025/189838
PCT Pub. Date: Sep. 18, 2025

(65) Prior Publication Data

US 2026/0111364 A1 Apr. 23, 2026

(30) Foreign Application Priority Data

Mar. 11, 2024 (CN) ......................... 202410270572.5

(51) Int. Cl.
*G06F 12/0862* (2016.01)
*G06F 12/0868* (2016.01)

(52) U.S. Cl.
CPC .. *G06F 12/0862* (2013.01); *G06F 2212/6024* (2013.01)

(58) Field of Classification Search
CPC ......... G06F 12/0862; G06F 2212/6024; G06F 13/1673; G06F 12/0868; G06F 2212/1024; G06F 2212/152; G06F 2212/6026
(Continued)

(56) References Cited

U.S. PATENT DOCUMENTS 12,135,649 B2 * 11/2024 Srinivasan ............ G06F 12/123
2017/0214674 A1 7/2017 Bakshi et al.
(Continued)

FOREIGN PATENT DOCUMENTS

CN 108874691 A 11/2018
CN 111143242 A 5/2020
(Continued)

OTHER PUBLICATIONS

Shu, J., Y. Chen, and Q. Wang. "Progress on the storage systems for disaggregated data centers." Sci Sin Inf 53.8 (2023): 1503-28.
(Continued)

*Primary Examiner* — Hashem Farrokh
(74) *Attorney, Agent, or Firm* — IPro, PLLC

(57) ABSTRACT

A data processing system and method, and a medium. In the present application, the data processing system includes a plurality of internal-memory devices and at least one host. After the host has received an accessing request, if the host has determined that the buffer element of the host does not store the target data that the accessing request is to access, the current host transmits the accessing request to the plurality of internal-memory devices, whereby the plurality of internal-memory devices respond to the accessing request, determine pre-buffered data by using the buffer-prefetching decision generator, and transmit the pre-buffered data to the buffer element of the current host to be stored.

20 Claims, 7 Drawing Sheets

(58) Field of Classification Search
USPC .................................................... 711/213, 103
See application file for complete search history.

(56) References Cited

U.S. PATENT DOCUMENTS

| | | | | |
|---|---|---|---|---|
| 2018/0285275 | A1* | 10/2018 | Barczak | G06F 12/0871 |
| 2021/0303469 | A1* | 9/2021 | Lu | G06F 9/5016 |
| 2023/0017643 | A1 | 1/2023 | Shah et al. | |
| 2023/0153279 | A1 | 5/2023 | Glass et al. | |

FOREIGN PATENT DOCUMENTS

| | | | |
|---|---|---|---|
| CN | 116483742 | A | 7/2023 |
| CN | 116680214 | A | 9/2023 |
| CN | 116708579 | A | 9/2023 |
| CN | 116795736 | A | 9/2023 |
| CN | 117591450 | A | 2/2024 |
| CN | 117873931 | A | 4/2024 |

OTHER PUBLICATIONS

Wenqiang ZU, et al. "Configurable and History Information-Aware Replacement Policy for a Multilevel Cache." Journal of Computer Research and Development. 52 (Suppl.) (2015): 163-170.

* cited by examiner

DATA PROCESSING SYSTEM AND METHOD, AND MEDIUM

CROSS-REFERENCE TO RELATED APPLICATION

The present application claims the priority of the Chinese patent application filed on Mar. 11, 2024 before the Chinese Patent Office with the application number of 202410270572.5 and the title of "DATA PROCESSING SYSTEM AND METHOD, AND MEDIUM", which is incorporated herein in its entirety by reference.

FIELD

The present application relates to the technical field of computers, and particularly relates to a data processing system and method, and a medium.

BACKGROUND

Currently, a host, when reading a back-end storage device, may additionally preread more data, and save the preread data into the buffer of the host. Such an implementation process requires determining the preread data at the host side, and determining the preread data at the host side occupies the resource of the host, which affects the efficiency of the host in processing front-end reading-writing requests.

SUMMARY

In view of the above, an object of the present application is to provide a data processing system and method, and a medium. The particular solutions are as follows:

In an aspect, the present application provides a data processing system, wherein the data processing system comprises a plurality of internal-memory devices and at least one host;

the plurality of internal-memory devices are connected to the at least one host;

the at least one host comprises a buffer element;

at least one of the plurality of internal-memory devices stores a buffer-prefetching decision generator; and the at least one host is configured for:

after has received an accessing request, in response to having determined that the buffer element of the at least one host does not store target data that the accessing request is to access, by the current host, transmitting the accessing request to the plurality of internal-memory devices, whereby the plurality of internal-memory devices respond to the accessing request, determine pre-buffered data by using the buffer-prefetching decision generator, and transmit the pre-buffered data to the buffer element of the current host to be stored.

In another aspect, the at least one internal-memory device is configured for:

after determining the pre-buffered data by using the buffer-prefetching decision generator, compulsorily saving the pre-buffered data into the buffer element of the current host.

In another aspect, the at least one internal-memory device is configured for:

after determining the pre-buffered data by using the buffer-prefetching decision generator, sending the pre-buffered data to the current host, whereby the current host saves the pre-buffered data into the buffer element of the current host.

In another aspect, the plurality of internal-memory devices and the at least one host communicate by using multi-hierarchy interconnected CXL exchanging devices.

In another aspect, the at least one host is configured for:

identifying the plurality of internal-memory devices and an instance of the CXL exchanging devices that is connected to the current host, and determining device numbers of the plurality of internal-memory devices and a device number of the CXL exchanging device that is connected to the current host.

In another aspect, a single upstream physical port of any one of the CXL exchanging devices is virtualized into a plurality of upstream virtual ports, and each of the upstream virtual ports is connected to one instance of the host or a downstream physical port of the other instances of the CXL exchanging devices.

In another aspect, the plurality of internal-memory devices form a memory pool, and the memory pool further comprises an internal-memory controller; and the internal-memory controller is configured for:

addressing the plurality of internal-memory devices in a unified mode, and storing an addressing table obtained by the addressing.

In another aspect, the internal-memory controller is configured for:

synchronizing the addressing table to the at least one host.

In another aspect, the internal-memory controller is configured for:

delimiting an internal-memory region of a single instance of the internal-memory devices in the memory pool into a plurality of internal-memory segments.

In another aspect, the internal-memory controller is configured for:

according to sizes of predetermined application-layer operations, delimiting the internal-memory region of the single internal-memory device in the memory pool into the plurality of internal-memory segments.

In another aspect, the internal-memory controller is configured for:

receiving a plurality of binding requests sent by different instances of the host, and according to the plurality of binding requests, binding the different instances of the internal-memory segments obtained by delimiting the internal-memory region of the single internal-memory device to the different hosts.

In another aspect, the internal-memory controller is configured for:

receiving a single binding request sent by any one instance of the host, and according to the single binding request, binding the internal-memory region of the single internal-memory device in the memory pool to the current host.

In another aspect, the at least one host is configured for:

generating an operation command based on the accessing request, via an instance of the CXL exchanging devices that is connected to the current host, sending the operation command to an internal-memory controller in a memory pool formed by the plurality of internal-memory devices, whereby the internal-memory controller determines a target internal-memory device in the memory pool, and executes the operation command to the target internal-memory device.

In another aspect, the at least one host is configured for:

in response to having determined that the buffer element of the at least one host stores the target data, by the current host, based on the target data in the buffer element of the current host, responding to the accessing request.

In another aspect, the at least one host further comprises a buffer controller; and the buffer controller is configured for:

detecting whether the buffer element of the current host stores the target data.

In another aspect, the at least one internal-memory device is configured for:

inputting the accessing request and physical addresses of the internal-memory devices into the buffer-prefetching decision generator, whereby the buffer-prefetching decision generator outputs a predicted physical address, and determines data stored in the predicted physical address to be the pre-buffered data.

In another aspect, the at least one internal-memory device is configured for:

determining a delay time and a historical-reading-time average value that correspond to the predicted physical address, and according to the delay time and the historical-reading-time average value, determining a transmission time sequence of the pre-buffered data.

In another aspect, the at least one internal-memory device is configured for:

determining a communication link between an instance of the internal-memory devices that the predicted physical address belongs to and an instance of the host that receives the accessing request, and counting up a link-hierarchy delay and a link-bandwidth delay of the communication link; and/or determining a device-performance delay of an instance of the internal-memory devices that the predicted physical address belongs to; and/or determining a region-performance delay of the predicted physical address in an instance of the internal-memory devices that the predicted physical address belongs to; and by using together the link-hierarchy delay, the link-bandwidth delay, the device-performance delay and/or the region-performance delay, obtaining the delay time that corresponds to the predicted physical address.

In another aspect, the at least one internal-memory device is configured for:

detecting whether a hit rate of the pre-buffered data and/or a predicted physical address outputted by the buffer-prefetching decision generator are correct, and according to a corresponding detection result, determining an accuracy of the buffer-prefetching decision generator; and in response to the accuracy being less than a preset threshold, according to the detection result, optimizing the buffer-prefetching decision generator.

In another aspect, the at least one internal-memory device is configured for:

by using a decision-tree classifier, detecting whether the hit rate of the pre-buffered data and/or the predicted physical address outputted by the buffer-prefetching decision generator are correct.

In another aspect, the present application provides a data processing method, wherein the data processing method is applied to at least one host, and the at least one host is connected to a plurality of internal-memory devices;

the at least one host comprises a buffer element;

at least one of the plurality of internal-memory devices stores a buffer-prefetching decision generator; and the data processing method comprises:

after the at least one host has received an accessing request, in response to the at least one host having determined that the buffer element of the at least one host does not store target data that the accessing request is to access, by the current host, transmitting the accessing request to the plurality of internal-memory devices, whereby the plurality of internal-memory devices respond to the accessing request, determine pre-buffered data by using the buffer-prefetching decision generator, and transmit the pre-buffered data to the buffer element of the current host to be stored.

In another aspect, the present application further provides a data processing method, wherein the data processing method comprises:

after at least one host has received an accessing request, if the at least one host has determined that a buffer element of the at least one host does not store target data that the accessing request is to access, by the current host, transmitting the accessing request to a plurality of internal-memory devices; and by the plurality of internal-memory devices, responding to the accessing request, by using a buffer-prefetching decision generator stored in at least one of the plurality of internal-memory devices, determining pre-buffered data, and transmitting the pre-buffered data to the buffer element of the current host to be stored;

the at least one host is connected to the plurality of internal-memory devices;

the at least one host comprises the buffer element; and at least one of the plurality of internal-memory devices stores the buffer-prefetching decision generator.

In another aspect, the present application provides a non-volatile readable storage medium, wherein the non-volatile readable storage medium is configured for storing a computer program, and the computer program, when executed by a processor, implements the method according to any one of the above embodiments.

It can be known from the above solutions that the present application provides a data processing system, wherein the data processing system comprises a plurality of internal-memory devices and at least one host. The plurality of internal-memory devices are connected to the at least one host. The at least one host comprises a buffer element. At least one of the plurality of internal-memory devices stores a buffer-prefetching decision generator. The at least one host is configured for: after has received an accessing request, in response to having determined that the buffer element of the at least one host does not store target data that the accessing request is to access, by the current host, transmitting the accessing request to the plurality of internal-memory devices, whereby the plurality of internal-memory devices respond to the accessing request, determine pre-buffered data by using the buffer-prefetching decision generator, and transmit the pre-buffered data to the buffer element of the current host to be stored.

The advantageous effects of the present application are as follows. The data processing system comprises a plurality of internal-memory devices and at least one host. After the host has received an accessing request, if the host has determined that the buffer element of the host does not store the target data that the accessing request is to access, the current host transmits the accessing request to the plurality of internal-memory devices, whereby the plurality of internal-memory devices respond to the accessing request, determine pre-buffered data by using the buffer-prefetching decision generator, and transmit the pre-buffered data to the buffer element of the current host to be stored. Accordingly, the buffer-prefetching decision generator is transferred from the host side to the internal-memory side, to reduce the load of the host, to increase the efficiency of the host in processing the accessing requests (including reading requests and writing requests). Furthermore, the internal-memory side may transmit the pre-buffered data directly to the buffer element of the current host to be stored, and the host is not required to request the pre-buffered data to the internal-memory side, which, as compared with the related solutions in which the internal-memory side merely detects the variation in the buffer of the host, may increase the efficiency in the pre-buffering.

BRIEF DESCRIPTION OF THE DRAWINGS

In order to more clearly illustrate the technical solutions of the embodiments of the present application or the prior art, the figures that are required to describe the embodiments or the prior art will be briefly described below. Apparently, the figures that are described below are merely embodiments of the present application, and a person skilled in the art can obtain other figures according to the provided figures without paying creative work.

DETAILED DESCRIPTION

The technical solutions according to some embodiments of the present application will be clearly and completely described below with reference to the drawings according to some embodiments of the present application. Apparently, the described embodiments are merely certain embodiments of the present application, rather than all of the embodiments. All of the other embodiments that a person skilled in the art obtains on the basis of some embodiments of the present application without paying creative work fall within the protection scope of the present application.

Currently, a host, when reading a back-end storage device, may additionally preread more data, and save the preread data into the buffer of the host. Such an implementation process requires determining the preread data at the host side, and determining the preread data at the host side occupies the resource of the host, which affects the efficiency of the host in processing front-end reading-writing requests. In view of the above, the present application provides a data processing system and method, and a medium, which may reduce the load of the host, to increase the efficiency of the host in processing reading-writing requests.

Figure 1:
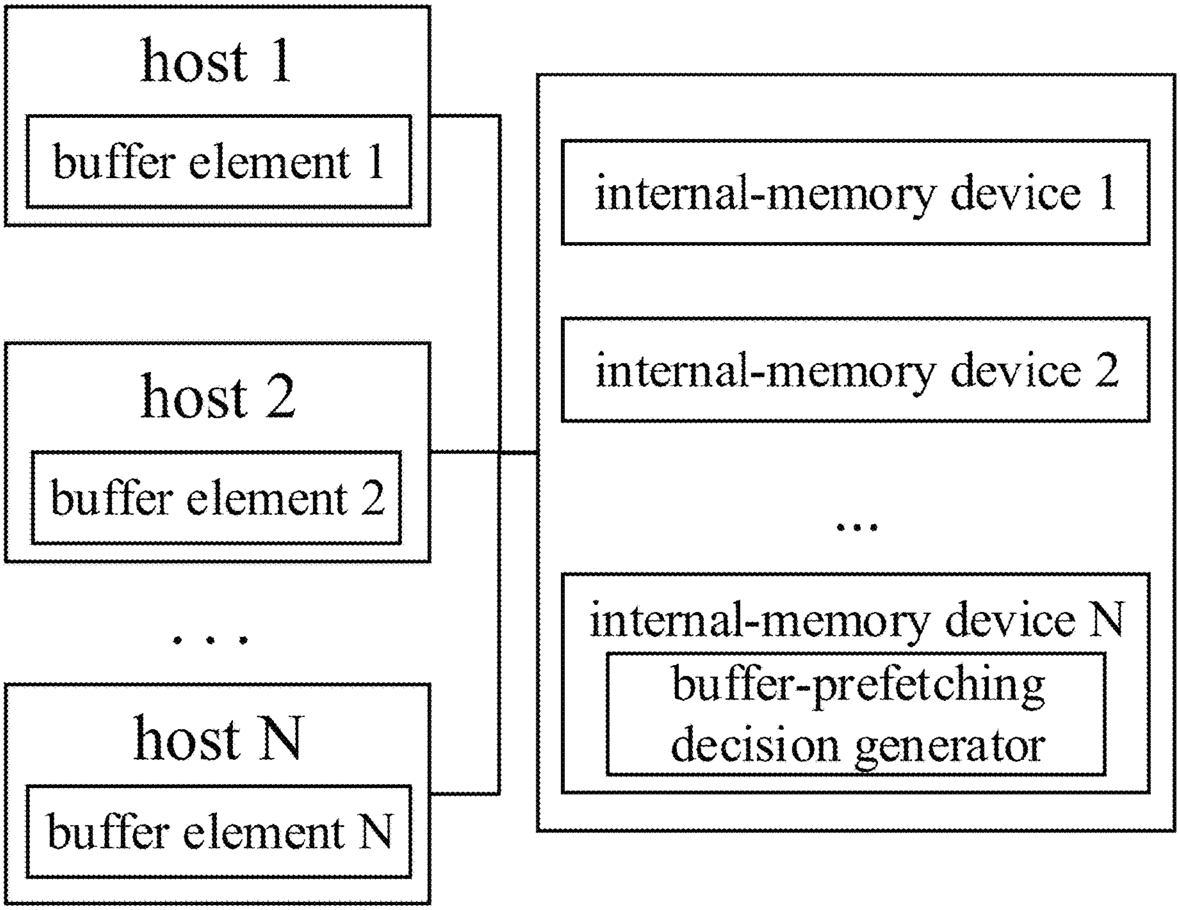
FIG. 1 is a schematic diagram of a data processing system according to some embodiments of the present application.

Referring to FIG. 1, some embodiments of the present application disclose a data processing system, wherein the data processing system comprises a plurality of internal-memory devices and at least one host. The plurality of internal-memory devices are connected to the at least one host. The at least one host comprises a buffer element. At least one of the plurality of internal-memory devices stores a buffer-prefetching decision generator. The host may be a device such as a server. The buffer-prefetching decision generator refers to any model that can predict the pre-buffered data, for example, a neural network model and a machine-learning model.

The at least one host is configured for: after has received an accessing request, if has determined that the buffer element of the at least one host does not store target data that the accessing request is to access, by the current host, transmitting the accessing request to the plurality of internal-memory devices, whereby the plurality of internal-memory devices respond to the accessing request, determine pre-buffered data by using the buffer-prefetching decision generator, and transmit the pre-buffered data to the buffer element of the current host to be stored. The plurality of internal-memory devices form a memory pool, and the memory pool monitors the state of variation in the data stored in the buffer element of the host, and can, based on the monitored state of variation, initiatively write the pre-buffered data into the buffer element of the host.

In an example, the at least one internal-memory device is configured for:

- after determining the pre-buffered data by using the buffer-prefetching decision generator, compulsorily saving the pre-buffered data into the buffer element of the current host; or
- after determining the pre-buffered data by using the buffer-prefetching decision generator, sending the pre-buffered data to the current host, whereby the current host saves the pre-buffered data into the buffer element of the current host.

In an example, the plurality of internal-memory devices and the at least one host communicate by using multi-hierarchy interconnected CXL (Compute Express Link, an open interconnection protocol) exchanging devices. Correspondingly, the at least one host is configured for: identifying the plurality of internal-memory devices and the CXL exchanging device that is connected to the current host, and determining the device number of the memory pool and the device number of the CXL exchanging device that is connected to the current host. The CXL exchanging devices refer to devices, such as an exchange, that communicate with the other sides via CXL.

In an example, a single upstream physical port of any one of the CXL exchanging devices is virtualized into a plurality of upstream virtual ports, and each of the upstream virtual ports is connected to one host or a downstream physical port of the other CXL exchanging devices.

In an example, the memory pool further comprises an internal-memory controller. The internal-memory controller is configured for: addressing the memory pool in a unified mode, and storing an addressing table obtained by the addressing. Correspondingly, the internal-memory controller is configured for: synchronizing the addressing table to the at least one host. Correspondingly, the internal-memory controller is configured for: delimiting an internal-memory region of a single instance of the internal-memory devices in the memory pool into a plurality of internal-memory segments. Correspondingly, the internal-memory controller is configured for: according to sizes of predetermined application-layer operations, delimiting the internal-memory region of the single internal-memory device in the memory pool into the plurality of internal-memory segments. Correspondingly, the internal-memory controller is configured for: receiving a plurality of binding requests sent by different instances of the host, and according to the plurality of binding requests, binding the different instances of the internal-memory segments obtained by delimiting the internal-memory region of the single internal-memory device to the different hosts. Correspondingly, the internal-memory controller is configured for: receiving a single binding request sent by any one instance of the host, and according to the single binding request, binding the internal-memory region of the single internal-memory device in the memory pool to the current host.

In an example, the at least one host is configured for:

generating an operation command based on the accessing request, and via the CXL exchanging device that is connected to the current host, sending the operation command to an internal-memory controller in the memory pool, whereby the internal-memory controller determines a target internal-memory device in the memory pool, and executes the operation command to the target internal-memory device.

In an example, the at least one host is configured for: if has determined that the buffer element of the at least one host stores the target data, by the current host, based on the target data in the buffer element of the current host, responding to the accessing request. The at least one host further comprises a buffer controller. The buffer controller is configured for: detecting whether the buffer element of the current host stores the target data.

In an example, the at least one internal-memory device is configured for: inputting the accessing request and the physical addresses of the internal-memory devices in the memory pool into the buffer-prefetching decision generator, whereby the buffer-prefetching decision generator outputs a predicted physical address, and determines data stored in the predicted physical address to be the pre-buffered data. In an example, the buffer-prefetching decision generator is a multi-modality model, and the forms of its inputted data and outputted data may be different. The inputted data include the program counter (i.e., the accessing request) and the physical addresses of all of the internal memories (i.e., the physical addresses of the internal-memory devices in the memory pool). The outputted data include the physical address of the to-be-preread internal memory. Particularly, the buffer-prefetching decision generator may be embodied in the architecture of Transformer (a deep-learning model), wherein the input is a program-counter instruction, and the output is the physical address of the to-be-preread internal memory. Because the program counter and the physical address of the to-be-preread internal memory are in different forms, it is referred to as a multi-modality model. The program counter, by encoding operations, is transformed into data that the multi-modality model can identify, and is inputted into the multi-modality model, and the outputted result of the multi-modality model, by decoding operations, is transformed into a predicted internal-memory physical address. The multi-modality model is an artificial intelligence model, and can accurately comprehend the reading-writing actions of the program counter, which may highly increase the accuracy of the pre-buffering, to highly increase the accessing speed. Certainly, the buffer-prefetching decision generator requires occupying a large space, and is difficult to be placed at the host side.

In an example, the at least one internal-memory device is configured for: determining a delay time and a historical-reading-time average value that correspond to the predicted physical address, and according to the delay time and the historical-reading-time average value, determining a transmission time sequence of the pre-buffered data. Correspondingly, the at least one internal-memory device is configured for: determining a communication link between an instance of the internal-memory devices that the predicted physical address belongs to and an instance of the host that receives the accessing request, and counting up a link-hierarchy delay and a link-bandwidth delay of the communication link; and/or determining a device-performance delay of an instance of the internal-memory devices that the predicted physical address belongs to; and/or determining a region-performance delay of the predicted physical address in an instance of the internal-memory devices that the predicted physical address belongs to; and by using together the link-hierarchy delay, the link-bandwidth delay, the device-performance delay and/or the region-performance delay, obtaining the delay time that corresponds to the predicted physical address.

The link-hierarchy delay is decided based on the length of the communication link between the internal-memory device and the host that receives the accessing request. The link-bandwidth delay refers to the total bandwidth delay in communication-link. The device-performance delay is decided by the characteristics of the internal-memory device itself. The region-performance delay depends on the position of the predicted physical address in the internal-memory device, wherein the position is as shown by the region 1: MLD1 (Memory Latency Determination), the region 2: MLD2, the region 3: MLD3 and the region 4: MLD4 in FIG. 4, and the different regions correspond to unequal region-performance delays.

In an example, by using a time-sequence predictor, it can be realized: according to the delay time and the historical-reading-time average value, determining a transmission time sequence of the pre-buffered data. The time-sequence predictor is simple to embody, and the rule-based time-sequence predictor uses a detection table to detect the time-sequence accessing mode in the operating load, wherein the detection table records the delay time and the historical-reading-time average value that correspond to the predicted physical address. If multiple pre-buffered data exist simultaneously, then the pre-buffered data are transmitted to the host in the order of the corresponding transmission time sequences. The time-sequence predictor may be provided in the buffer-prefetching decision generator.

In an example, the at least one internal-memory device is configured for: detecting whether a hit rate of the pre-buffered data and/or a predicted physical address outputted by the buffer-prefetching decision generator are correct, and according to a corresponding detection result, determining an accuracy of the buffer-prefetching decision generator; and if the accuracy is less than a preset threshold, according to the detection result, optimizing the buffer-prefetching decision generator. Correspondingly, the at least one internal-memory device is configured for: by using a decision-tree classifier, detecting whether the hit rate of the pre-buffered data and/or the predicted physical address outputted by the buffer-prefetching decision generator are correct.

In the present embodiment, the data processing system comprises a memory pool and at least one host. After the host has received an accessing request, if the host has determined that the buffer element of the host does not store the target data that the accessing request is to access, the current host transmits the accessing request to the plurality of internal-memory devices, whereby the plurality of internal-memory devices respond to the accessing request, determine pre-buffered data by using the buffer-prefetching decision generator, and transmit the pre-buffered data to the buffer element of the current host to be stored. Accordingly, the buffer-prefetching decision generator is transferred from the host side to the memory pool, to reduce the load of the host, to increase the efficiency of the host in processing the accessing requests (including reading requests and writing requests). Furthermore, the memory pool may transmit the pre-buffered data directly to the buffer element of the current host to be stored, and the host is not required to request the pre-buffered data to the memory pool, which, as compared with the related solutions in which the internal-memory side merely detects the variation in the buffer of the host, may increase the efficiency in the pre-buffering.

One single host may comprise at least one switch (exchange) device that support the CXL protocol, wherein the upstream port of the switch device is used to be connected to the host, and the downstream port is used to be connected to other switch devices, a plurality of accelerating devices and the memory pool. After the downstream port of the switch device has completed the configuring of a configuration space and the distribution of the base address of the BAR (Base Address Register) bus, the downstream devices may periodically broadcast their own free-memory information to each other via PCIe (Peripheral Component Interconnect Express, a high-speed serial computer expansion-bus standard) interfaces, thereby realizing the direct PCIE communication between the downstream devices. The switch device can excellently realize the communicative interconnection between the host and its downstream devices. The PCIE is a high-speed serial peer-to-peer dual-channel high-bandwidth transmission, and the connected devices are allocated with and exclusively occupy the channel bandwidths. The PCI Express has various specifications from PCI Express x1 to PCI Express x32, which may satisfy the demands by low-speed devices and high-speed devices that will emerge in a certain time in future. The PCI-Express interface is a PCIE 3.0 interface, with a bit rate of 8 Gbps, which is approximately two times the bandwidths of the last-generation products, and comprises a series of important functions such as transmitter-receiver balance and clock data recovery, to improve the performances of data transmission and data protection. The PCI Express bus link supports the full-duplex communication between any two nodes. The channel is formed by two differential-signal pairs, wherein one pair is used to receive data and the other pair is used to emit data, and further has a pair of differential reference clocks. Therefore, each of the channels is formed by four data lines. In concept, each of the channels is used as a full-duplex byte stream, and transmits data packets in the 8-bit byte format simultaneously in the two directions between the link nodes. A physical PCI Express link may comprise 1 to 32 channels.

The CXL protocol is compatible with the PCIE standard, and can solve the problem in the consistency of the buffer and internal memory accessing of hetero-structure devices, to enable the internal memory of an accelerating device, the memory pool and the buffer of the host to be globally quickly accessed by all of devices that support the CXL protocol. The CXL technique maintains the internal-memory consistency between the memory space of the CPU and the internal memory in the connecting device, which may support resource sharing (or the memory pool) to obtain a higher performance, reduce the complexity of software stacking, and reduce the overall system cost. Therefore, by using the CXL interfaces, the CPU of the host can communicate with GPU accelerating devices, FPGA accelerating devices and so on, to result in a higher data processing efficiency and a lower local data processing delay. The CXL is formed by three dynamic multiplexing sub-protocols in a single link, including an IO protocol (i.e., CXL.io) similar to PCIE, a cache protocol (i.e., CXL. cache) and an internal-memory accessing protocol (i.e., CXL. memory). According to a particular accelerating-device usage mode, all of the sub-protocols may be enabled, or merely one sub-protocol may be enabled. The operations such as finding and enumeration, error reporting and host physical-address looking-up require enabling the CXL.io protocol. A main advantage of the CXL is that it provides a low-delay and high-bandwidth path for the accelerating devices to access the system. The internal-memory-buffer consistency of the CXL allows sharing the internal-memory resource between the CPU of the host and the accelerating devices.

In an example, the accelerating devices downstream of the switch device in one host may directly communicate with each other by using the DMA method, without communicating via the host. If any of the accelerating devices requires transmitting data, then it, according to the idle internal-memory capacity and the accelerator-card function, determines the other accelerating devices in the current host that is used to process the data, and inquires the idle-internal-memory information of the other accelerating devices in itself; and, subsequently, by using the direct-memory-access controller in itself and the idle-internal-memory information, writes the currently-to-be-transmitted data into the internal memories of the other accelerating devices in the mode of direct memory access. The switch device is a multi-network-interface device, its main function is forwarding data between the different ports, and it has data interfaces to connect to other devices.

In an example, the host further comprises a data transmitting device. The data transmitting device is configured for: according to an internal-memory application by at least one remote device, straightly connecting a segment of memory address of the corresponding remote device, whereby the host, by using the data transmitting device, directly accesses a model-training task stored in the remote device and its relevant data. The data transmitting device comprises an address parsing module and a plurality of internal-memory accessing modules. Each of the internal-memory accessing modules is configured for, according to an internal-memory application by at least one remote device, straightly connecting a segment of memory address of the corresponding remote device, and supports time division multiplexing of the different remote devices that it is connected to. The remote devices that are accessed directly by each of the internal-memory accessing modules share the processor and the accelerating devices of the controlling host. Each of the internal-memory accessing modules comprises a Remote Direct Memory Access (remote direct data accessing) unit.

Another data processing system according to the present embodiment comprises a plurality of hosts. Any host comprises a plurality of accelerating devices and one memory pool. The accelerating devices are, for example, FPGA accelerator cards and GPU accelerator cards. The plurality of hosts include a controlling host, and the controlling host divides the same one model-training task into a plurality of sub-tasks, and distributes the plurality of sub-tasks to the plurality of hosts. The plurality of hosts, concurrently, execute the received sub-task by using the plurality of accelerating devices in itself, and store the training data, the intermediate result and the weight data that correspond to the corresponding sub-task by using the memory pool in itself. The controlling host, by using the memory pool in itself, collects and processes the weight data stored in the memory pools in the plurality of hosts, and writes the latest weight data that are obtained by the processing back into the memory pools in the plurality of hosts. The memory pool may be an internal-memory expansion card that is implemented based on FPGA.

In the present embodiment, the model-training task is used to implement the training of various intelligent models, and the intelligent models may be of any structure, and may be used to implement data-encryption tasks, data-decryption tasks, image-identification tasks, image-classification tasks and so on. The hosts can realize resource sharing, which may increase the calculation speed. In the present embodiment, the one model-training task is divided into a plurality of sub-tasks that concurrently run, and those sub-tasks are distributed to the different host nodes, whereby they run simultaneously in those host nodes, so as to increase the calculation speed. If a certain host node among them has a too heavy load, then some of its operations may be moved to the other host nodes to be executed, thereby alleviating the load of the host node. Such an operation migration is referred to as load balancing. If a certain node among them fails, then the other nodes can operate continuously, and the entire system does not totally collapse due to the failure of one or a few nodes. Therefore, the system has an excellent fault-tolerance performance. The system can also detect failures of the nodes, and recover them from the failures by proper means. The system, after has determined the node where the failure is, does not use the node to supply services, until it recovers normal operation. The function of the failed node may be completed by the other nodes, and when the failed node has been recovered or repaired, the system may integrate it into the system smoothly.

In an embodiment, the processor of the host is configured for: according to an internal-memory applying request sent by any remote device, inquiring an idle internal-memory accessing module in the data transmitting device; and, if an idle internal-memory accessing module has been inquired, then, for the idle internal-memory accessing module, generating an address configuring operation, and sending the address configuring operation to the idle internal-memory accessing module. Correspondingly, the idle internal-memory accessing module is configured for: according to the address configuring operation, configuring, in itself, an memory-address range that is carried by the address configuring operation and corresponds to the any remote device, and constructing a remote internal-memory accessing connection with the current remote device. Correspondingly, the address parsing module is configured for: recording the mapping relation between the memory-address range, the current remote device and the internal-memory accessing module configured with the memory-address range. The processor is configured for: according to an internal-memory applying request sent by any remote device, for the idle internal-memory accessing module in the data transmitting device, generating an address configuring operation, and sending the address configuring operation to the data transmitting device. Correspondingly, the data transmitting device is configured for: causing the idle internal-memory accessing module to, according to the address configuring operation, configure, in itself, an memory-address range that is carried by the address configuring operation and corresponds to the any remote device, and construct a remote internal-memory accessing connection with the current remote device.

In an embodiment, the processor of the host is configured for: if an idle internal-memory accessing module is not inquired, then returning an application-failing message to the corresponding remote device. In an embodiment, the processor of the host is configured for: according to an internal-memory applying request sent by any remote device, detecting the size of the memory space of the memory-address range; determining the internal-memory mode matching with the size of the memory space; and managing the corresponding memory space according to the internal-memory mode. In an embodiment, the processor of the host is configured for: setting a configurable address range size for each of the internal-memory accessing modules in the data transmitting device.

The CXL is a buffer-consistency interconnection protocol, and can separate the internal memory and the calculation, to construct a large-scale extended memory. The persistent internal memory, as compared with the dynamic random access memory, has the advantages of a low cost and a large capacity, and therefore a byte addressing solid-state disk that uses the CXL protocol and a persistent internal memory may be used as the extended memory. For example, the CXL may be integrated into a solid-state disk that supports Optane (an ultra-high-speed internal-memory technique), to realize layered internal-memory expansion, wherein Optane may also be replaced with Z-NAND (an NAND flash-memory technique of a particular type) or XLFlash (a high-performance storage solution). Both of Z-NAND and XLFlash are also internal-memory techniques.

It can be seen that the combination of the CXL and a solid-state disk can allow expanding and accessing a high-capacity internal-memory, but its speed is less than that of the dynamic random access memory. Accordingly, the DRAM (Dynamic Random Access Memory) of a solid-state disk may be used as the buffer, which is similar to the storage using a high-performance NVMe (Non-Volatile Memory express, non-volatile internal-memory host controller interface specification) disk having a larger DRAM, which may effectively reduce the writing delay.

However, it should be noted that, when an SSD (Solid State Drives, solid-state disk) that supports the CXL is used as the internal memory of the host, there are problems that the CPU (Central Processing Unit) of the host has a low hit rate for the buffer of the internal-memory architecture that combines the CXL and the SSD, and that the different CXL-SSDs (SSD that supports the CXL) that are located at different positions in the CXL switching network have unequal delays. Accordingly, the pre-buffering technique may be introduced to increase the hit rate of the buffer, and reduce the delay. The pre-buffering technique may be implemented based on a space prefetching method and/or a time prefetching method, wherein generally, based on the pre-buffering technique, the data are buffered in advance in the last one level of the buffer (LLC, Last Level Cache) of the CPU of the host.

The interconnection-network topological structure used in the CXL-based internal-memory separation may increase the internal-memory capacity in an expansible manner. The CXL introduces a multi-stage exchanging system structure. Adjustment of the position of the internal-memory device in the network may result in unequal delays of the internal-memory device, because the CXL exchanges of different hierarchies require unequal processing durations.

The CXL comprises three sub-protocols: CXL.io, CXL. cache and CXL. mem. Because the CXL is constructed on the existing PCIe physical layer, the CXL.io is equivalent to the PCIe protocol functionally. The CXL. cache can realize the function of accessing the internal memory of the host in a high efficiency. The CXL. mem enables the host to access the connected internal-memory device at any position in the corresponding CXL network. Therefore, the CXL.io and the CXL. mem are used to connect a plurality of internal-memory devices and create a large-scale memory pool, i.e., using the two sub-protocols CXL.io and CXL. mem to construct the memory pool.

Particularly, the memory pool is a multi-hierarchy memory pool, and the plurality of CXL internal-memory devices in the memory pool may be interconnected by one or more CXL exchanges (i.e., CXL exchanging devices). One CXL exchange comprises a plurality of upstream physical ports and downstream physical ports, at least one upstream physical port, at least one downstream physical port and a manager form one group, and each of the groups can be connected to the host and the CXL internal-memory devices. It can be seen that a structure-oriented manager may configure the upstream physical ports and the downstream physical ports of the CXL exchange, whereby each of the hosts accesses its own CXL internal-memory devices via a particular data path referred to as a virtual hierarchy. Based on the virtual hierarchy, one upstream physical port may be virtualized into a plurality of virtual upstream ports. Further, the CXL supports multi-hierarchy interconnection, so that the upstream physical ports or the downstream physical ports of the CXL exchange can be connected to the other CXL exchanges, which significantly increases the quantity of the internal-memory devices in each of the virtual hierarchy, which may highly improve the expandability of resource separation.

In some examples, particularly, three internal-memory interconnection architectures of different hierarchies may be used, which are a single exchange, multi-hierarchy interconnection and virtual internal-memory division.

Figure 2:
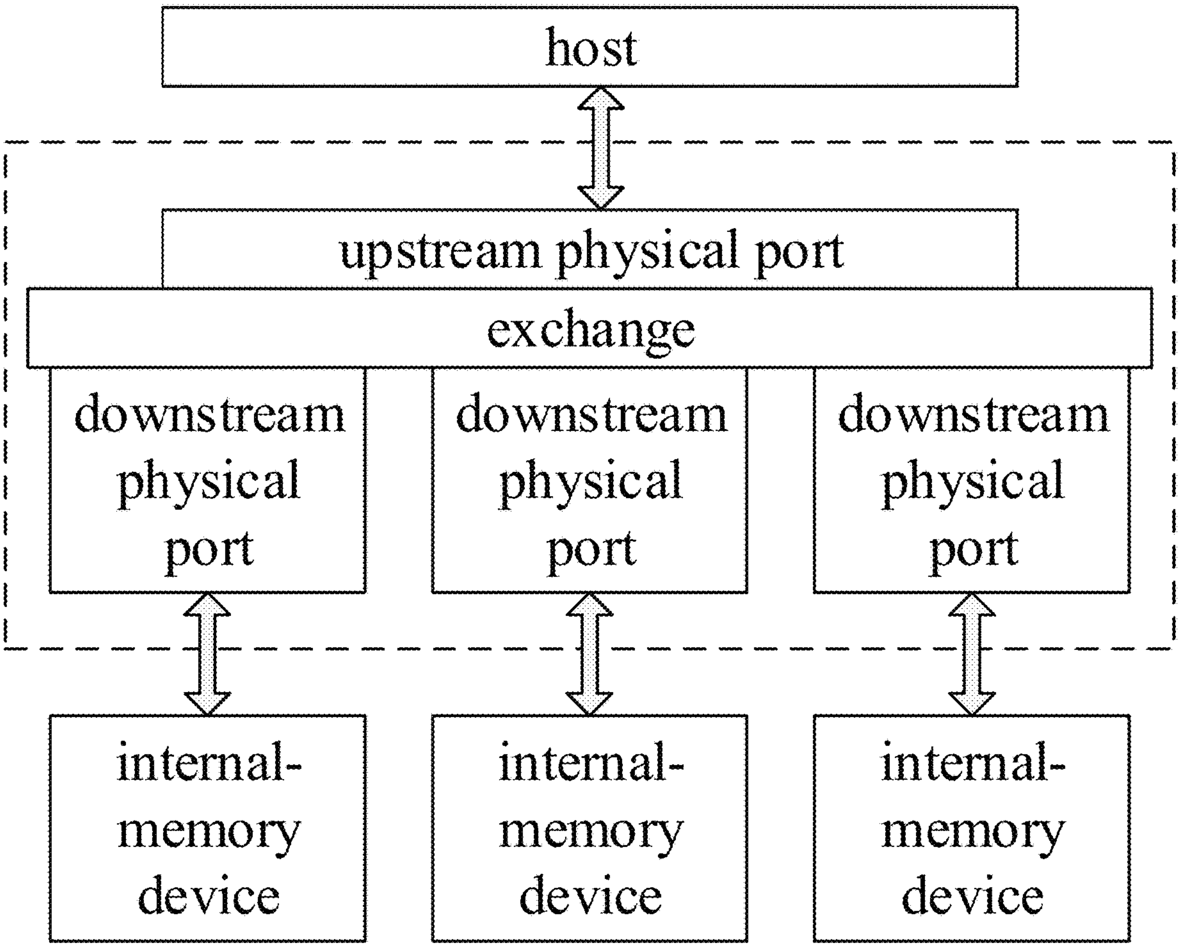
FIG. 2 is a schematic diagram of a system of the architecture of internal-memory interconnection formed by a single exchange according to some embodiments of the present application.

Referring to FIG. 2, the system of the architecture of internal-memory interconnection formed by a single exchange may comprise one host, the host is connected to the upstream physical ports of the exchange device, and each of the downstream physical ports of the exchange device is connected to one internal-memory device. The host, the exchange device and the internal-memory devices realize the communication based on the CXL.

Figure 3:
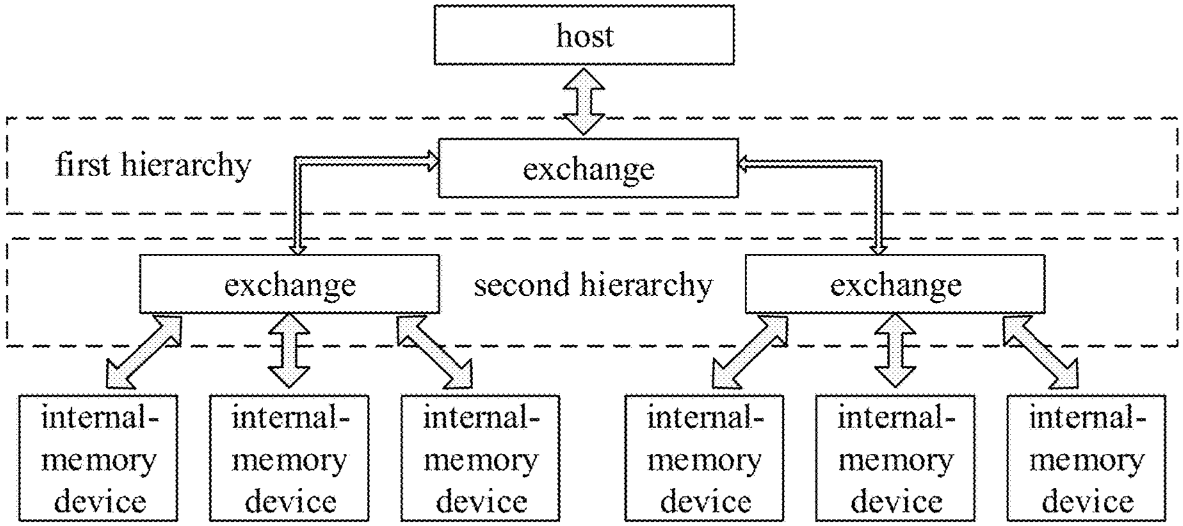
FIG. 3 is a schematic diagram of a system of the architecture of multi-hierarchy interconnection according to some embodiments of the present application.

Referring to FIG. 3, the system of the architecture of multi-hierarchy interconnection may comprise one host and three exchange devices, one of the exchange devices is located at the first hierarchy, the other two exchange devices are located at the second hierarchy, and each of the downstream physical ports of the two exchange devices of the second hierarchy is connected to one internal-memory device. The host, the exchange devices and the internal-memory devices realize the communication based on the CXL.

Figure 4:
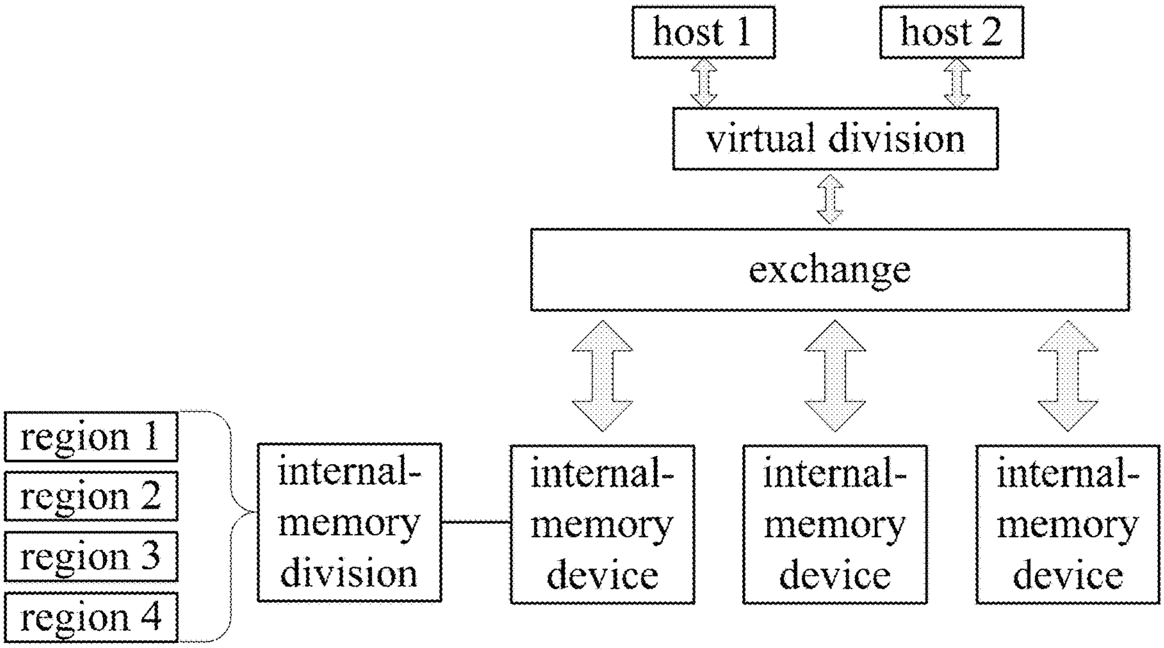
FIG. 4 is a schematic diagram of a system of the architecture of virtual internal-memory division according to some embodiments of the present application.

Referring to FIG. 4, the system of the architecture of the virtual internal-memory division may comprise two hosts and one exchange device, the two hosts are connected to two upstream virtual ports obtained by virtualizing the same one upstream physical port of the exchange device, and each of three downstream physical ports of the exchange device is connected to one internal-memory device. The internal-memory region of the internal-memory device 1 is delimited into four regions, which are the region 1: MLD1, the region 2: MLD2, the region 3: MLD3 and the region 4: MLD4. Those four regions can be seen by the host 1 and the host 2, and the different regions are used by different processors, and cannot be shared.

In the next step, the logic mapping of the memory pool is implemented, wherein what is particularly implemented is the mapping from the physical addresses of the internal memories to the logical address of the CXL memory pool.

Firstly, the hierarchy of the CXL exchange is identified. The buffer element of the host is a module comprising hardware and software, wherein the hardware comprises the buffer of the host, and the software comprises a buffering strategy. The buffer element of the host, during the PCIe enumeration, effectively identifies the hierarchies of the PCIe exchanges of the internal-memory devices, to determine how many CXL exchanges exist between the host and the internal-memory devices. The host uses the CXL.io to access the configuration spaces of all of the connecting devices (including the internal-memory devices and the CXL exchanges), and organizes the system bus of them in the CXL network.

It should be noted that, during the PCIe enumeration, every time one new device has been identified, one device serial-number and the corresponding bus are determined, and one unique serial number is allocated to the bus. The CXL exchange runs as a PCIe bridging device that has its own bus number, so that the quantity of the exchanges between the CPU of the host and the target internal-memory device can be determined. The buffer element of the host may comprise a processor at its RC (Root Complex) terminal. The RC terminal is located between the CPU and the CXL exchange, and can store all of the information obtained during the above-described enumeration, wherein the information is used to more accurately estimate the prefetching time sequence.

Figure 5:
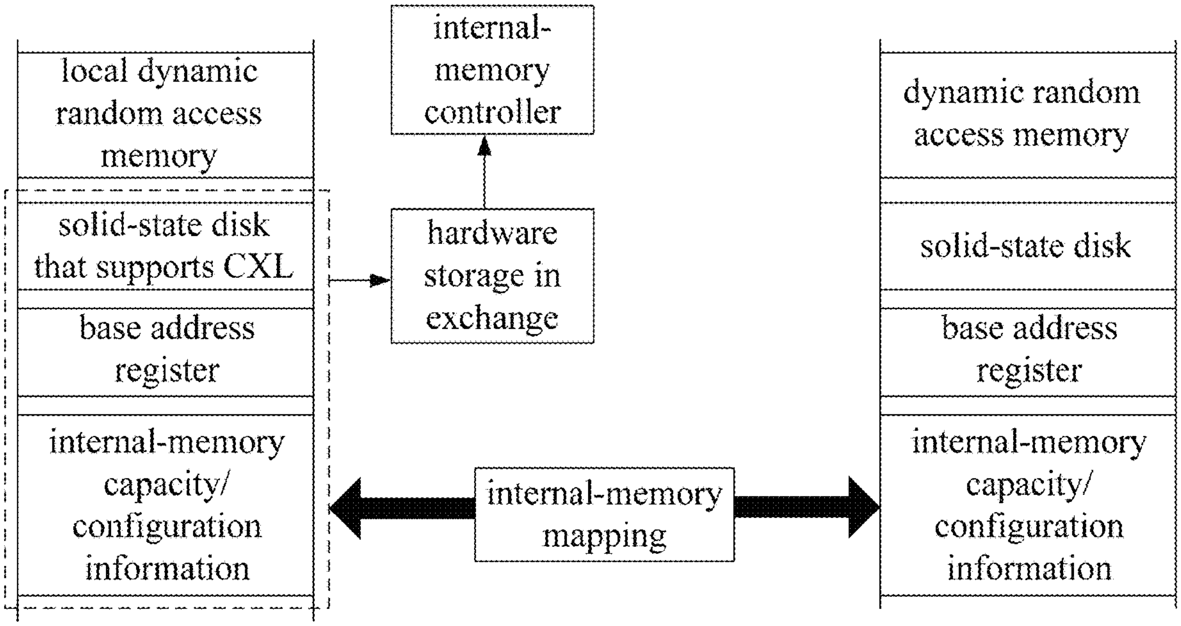
FIG. 5 is a schematic diagram of an internal-memory mapping according to some embodiments of the present application.

The host, at starting-up, enumerates all of the internal-memory devices, and initializes to map the internal-memory segments of BAR, SSD and DRAM to the host, wherein BAR and SSD correspond to different internal-memory segments. Simultaneously, the CXL internal-memory controller also saves the mapping information. The host may update the corresponding internal-memory-segment mapping by using the internal-memory information and the configured information segments of the internal-memory devices. All of the internal-memory devices are addressed in a unified mode, and, when a certain program in the host requires using the internal memory, it is allocated the corresponding memory address segment. Referring to FIG. 5, the RC maps and stores the physical internal memories (including DRAM and SSD), the BAR (Base Address Register), the internal-memory capacity and the configuration information of the memory-pool side in the RP (Root Point, the hardware in the exchanging device), and the internal-memory controller also saves those data.

After the CXL memory pool has been constructed, the host transmits the load/store reading-writing instructions by using the CXL. mem and the CXL.io, and accesses the internal memory by using the CXL message data packets generated by a data-stream controlling unit (such as a flit software). Such a flit-based communication mode enables various internal memories and storage mediums to be integrated into the memory pool. The communication mode combining the CXL and flit effectively separates the internal-memory resource from the host. Furthermore, based the CXL, Back Invalid (BI) may be introduced, and the memory pool performs reverse-monitoring to the buffer region of the host by using the CXL. mem, which may enable the internal-memory side to initiatively disable the data in the buffer region of the host. Certainly, the usage of the CXL. cache may also enable the internal-memory side to initiatively disable the data in the buffer region of the host.

Figure 6:
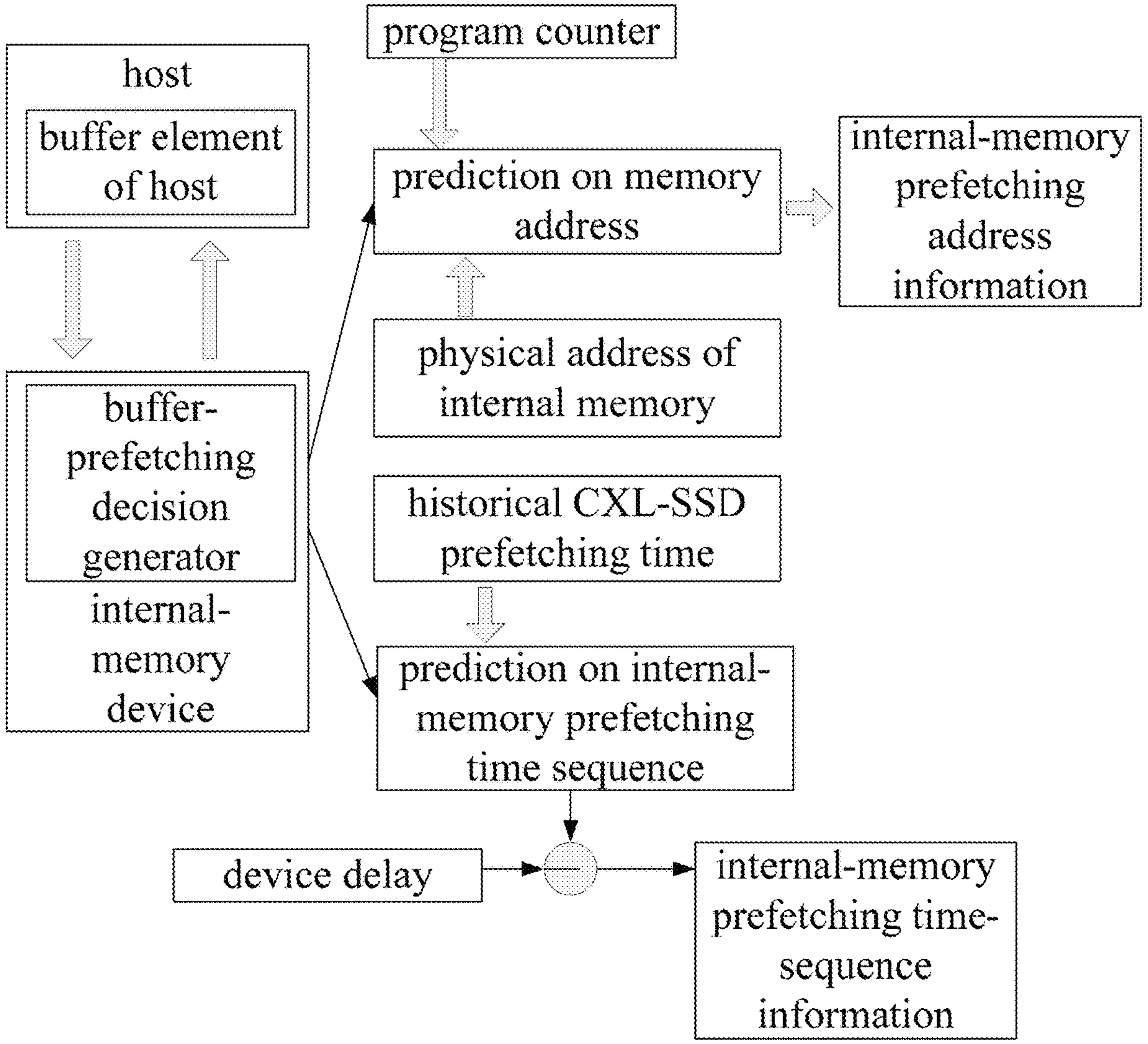
FIG. 6 is a schematic diagram of the layout and the function of a buffer element of the host and a buffer-prefetching decision generator according to some embodiments of the present application.

Referring to FIG. 6, the buffer element of the host and the buffer-prefetching decision generator form a buffer prefetcher. The buffer element of the host is provided at the host side, and comprises the RC and the buffer controller (containing the buffer software strategy) of the host side. The buffer-prefetching decision generator is provided in an internal-memory device in the memory pool whose capacity is greater than a constant value. The buffer element of the host can provide critical information required by the decision making to the buffer-prefetching decision generator, including the depth of the exchange where the program counter (i.e., operation instruction) and the internal-memory device are located, and relays a buffer-prefetching result determined by the buffer-prefetching decision generator. In order to realize that, the buffer element of the host records the updating state of the buffer lines prefetched by the buffer-prefetching decision generator by using a small-scale buffering region (which is divided from the third level of buffer L3 of the host, and may be set to be 16 KB), which may ensure that the buffer controller of each of the hosts in the CXL network firstly checks the buffer region of the buffer element of the host. If in the RC the data required by the request have already existed, then the buffer controller directly provides the data from the buffer region in the RC and completes the response processing process, without traversing the entire memory pool.

Referring to FIG. 6, the buffer-prefetching decision generator may be implemented based on a space prefetching method and a time prefetching method. The space prefetching method predicts the to-be-read memory address by adding a deviation amount to the currently accessed address. In operation, the deviation amount is optimized to minimize the buffer missing rate. The time prefetching method can record a buffer missing sequence, and, from a position in the buffer missing sequence where it might happen again, provide the data to the buffer lines of the host.

In order to satisfy the requirement on the accuracy, the performance of the buffer-prefetching decision generator may be enhanced by using the technique of deep learning. The prefetching essentially involves prediction, and therefore the technique of deep learning realizes a better performance exhibition of the buffer-prefetching decision generator. However, it is difficult to deploy the buffer-prefetching decision generator inside the host, because model calculation and metadata management at the host side require a large storage space, which reduces the load of the host.

In the present embodiment, the buffer-prefetching decision generator is unloaded from the host to the memory pool, which may realize a complicated prefetching strategy. In an example, the buffer-prefetching decision generator may be in a hetero-structure form, the buffer-prefetching decision generator performs irregular internal-memory accessing in a random mode, and the buffer-prefetching decision generator, after has determined the prefetching position (to-be-read memory address), subsequently transmits the data from the position to the buffering region of the buffer element of the host. The buffer-prefetching decision generator further provides the function of recording the memory addresses that are predicted previous times, whereby on-line fine adjustment on the buffer-prefetching decision generator can be performed. Particularly, the buffer hitting actions of the application programs are monitored by the decision-tree classifier, and are fed back to the buffer-prefetching decision generator according to the accuracy of the address prefetching. When the accuracy decreases, the buffer-prefetching decision generator itself performs fine parameter adjustment, to perform the model optimization, to increase the accuracy of the prediction on the memory address.

The time-sequence predictor in the buffer-prefetching decision generator determines the lengths of the historical reading durations corresponding to a single memory address by averaging the previous arrival durations, so as to estimate the reading durations of the future data in that address. In order to predict the next arrival duration, all of the previous arrival durations in its historical window are required to be recorded in the buffering region.

If the accessing request is responded to by the host, the buffer element of the host transmits the buffer-hitting event to the buffer-prefetching decision generator by using the CXL.io, and may simultaneously record the responding duration of this time, so that the time-sequence predictor can accordingly calculate the average value of the previous reading durations of the single memory address.

It should be noted that too early prefetching of the data might pollute the buffer of the host, to reduce its hit rate, while too late prefetching might excessively delay the execution. Therefore, an accurate locating of the exact prefetching time sequence of the pre-buffered data is of vital importance. The practical prefetching time sequence may be decided comprehensively by taking into consideration the capacity of exchanging the data objects of the internal-memory device (i.e., the device-performance delay), the link-hierarchy delay, the link-bandwidth delay and/or the region-performance delay, i.e., accordingly calculating the delay overhead generated between the RC and the target internal-memory device. The buffer element of the host stores that delay overhead in the configuration space of the corresponding internal-memory device.

Figure 7:
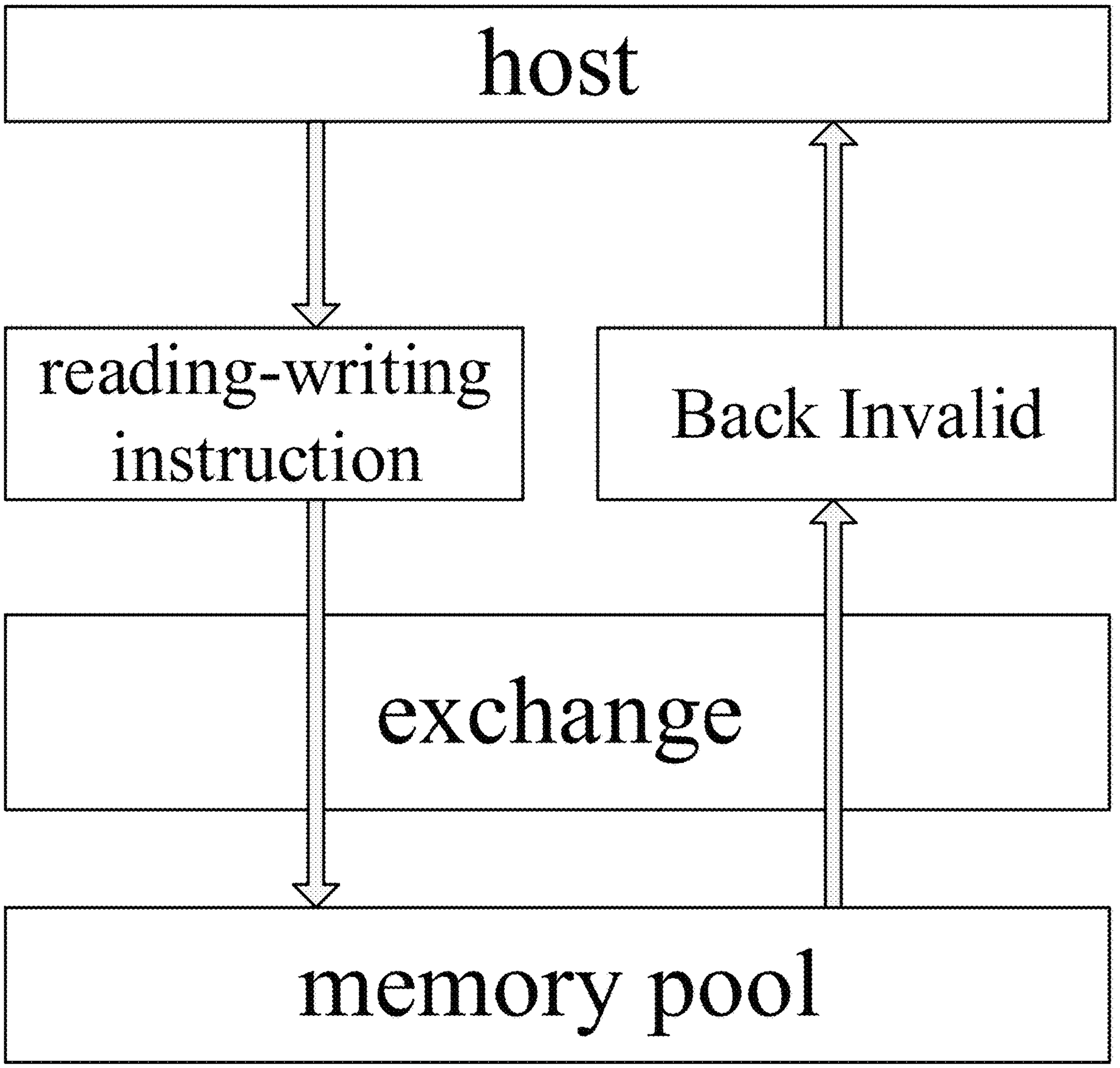
FIG. 7 is a schematic diagram of a communication process according to some embodiments of the present application.

Referring to FIG. 7, the process of transmitting the reading-writing instruction from the host side to the memory-pool side comprises: when the host performs the load/store operation to the internal-memory device, generating CXL operation-information transmission packets by the CXL RP, and transmitting to the internal-memory device by the CXL. mem; by the internal-memory controller, parsing the CXL operation-information transmission packets, to obtain a command operational character, the to-be-read memory address, and so on; and, by the internal-memory controller and the storing firmware, interacting, to execute the corresponding command operation. Based on the CXL. mem, in order to accurately predict the address, and timely transmit the accessing request, the transaction data of the host based on the CXL. mem to the internal memory include a request without data, a request with data, and a back-invalid response. The request without data is mainly used for internal-memory reading-operation codes without a payload, while the request with data carries internal-memory writing-operation codes. The request with data allows 13 self-defined operation codes prescribed by the CXL, which include one internal-memory reading-operation code used to carry an instruction. The back-invalid response is a response to a back-invalid sniffing command of the internal-memory device.

When the prefetching time has arrived, the buffer-prefetching decision generator predicts the memory address, and updates the data in the memory address to the buffering region of the buffer element of the host. The transaction message using the CXL. mem from the memory pool to the host is, similar to the request without data of the CXL. mem, a message without a payload, and is used to merely monitor the state of the buffer of the host. The state of the buffer of the host includes an M (Modified) state, which indicates that the data exist merely in the current buffer, and the data in that buffer are different from the data in the storage unit of the subsequent level. In other words, the latest data are located in the current buffer, the other buffers have no backup, and the content in the buffer lines is inconsistent with those in the main memory. The state of the buffer of the host further includes an O (Owned) state, which describes that one buffer line is dirty, and might exist in a plurality of (more than one) buffers. One buffer line in the Owned state stores the latest and correct data. Merely the buffer of one core may save the data in the Owned state, and the others are in the Shared state. The state of the buffer of the host further includes an E (Exclusive) state, which indicates that the data exist merely in the current buffer line, and are clean. The data in the buffer lines in the buffer are consistent with those in the main memory, and the buffers in the other cores do not have data backup of that address, which exists in merely one buffer. The state of the buffer of the host further includes an S (Shared) state, which indicates that the data in the buffer lines are not necessarily consistent with those in the main memory, and, correspondingly to the buffer line in the Owned state, the data in the Owned state are replicated to the buffer line in the Shared state. Therefore, the data in the Shared state are also the latest. The state of the buffer of the host further includes an I (Invalid) state, which represents invalid data.

The present embodiment further introduces a new BI operation code, which is referred to as BISnoopData, and allows using 10 self-defined operation codes. By using the BISnoopData, the buffer-prefetching decision generator generates a payload along with that message, which contains data for updating the buffer of the host. Alternatively, the buffer element of the host, when has detected the BISnoop-Data, waits for the corresponding payload, and inserts the data obtained by the waiting into its buffering region, so that the buffer controller can acquire the data to execute. In an example, when the host reads the data 1 in the memory pool, the data 1 are returned to the host and buffered by the host, and, before the next request arrives, according to the address predicted by the buffer-prefetching decision generator, the data 2, 3 are prefetched to the buffer of the host.

It can be seen that the present embodiment provides an internal-memory architecture that combines CXL-SSD and DRAM, which unloads the pre-buffering of the last one level of the buffer (LLC, Last Level Cache) from the CPU of the host to the memory-pool side. The data pre-buffering is performed by using the buffer-prefetching decision generator, and the internal-memory lines at the host side are back-invalidated by using the CXL. mem, to ensure the data consistency. Furthermore, the prefetching time may be accurately estimated, which reduces the buffer prefetching duration from the host to the CXL-SSD, and enables the buffer of the host to directly access the data in most of internal-memory architectures that combine DRAM and CXL-SSD. Because the decision-making process of the buffer prefetching happens at the CXL-SSD side, the storage capacity and the computing power are higher, which may realize a complicated prefetching strategy, to increase the buffer hit rate of the host side to the CXL-SSD.

In the present embodiment, the data prefetching may be performed cross the plurality of internal-memory devices, the logics at the buffer prefetching host ensures that the CXL-SSD maintains the sensing of the semantics executed by the CPU of the host, and the logics at the CXL-SSD side, by using the back-invalid mechanism of the CXL.mem, maintains the data consistency between the buffer of the host and the CXL-SSD. Such a bidirectionally cooperative method allows the user applications to access most of the internal-memory data directly in the host, thereby significantly reducing the relying on the CXL-SSD. In another aspect, in order to completely know the prefetching delays of different CXL-SSDs, during the PCIe enumeration and the device finding, the underlying CXL network topology and the device delay are identified, more precise end-to-end delay of the CXL-SSD in each of the networks is calculated by using those data, and communication is performed by writing that value into the PCIe configuration space of each of the devices. Accordingly, the optimal time of transmitting the data from the memory pool to the buffer of the host may be determined, thereby effectively reducing the long delay introduced at the back end of the CXL-SSD.

A data processing method according to some embodiments of the present application will be described below, and the data processing method described below and the other embodiments described herein may refer to each other.

Some embodiments of the present application disclose a data processing method, wherein the data processing method is applied to a host in a data processing system, and the method comprises: after has received an accessing request, if has determined that the buffer element of the at least one host does not store target data that the accessing request is to access, by the current host, transmitting the accessing request to the plurality of internal-memory devices, whereby the plurality of internal-memory devices respond to the accessing request, determine pre-buffered data by using the buffer-prefetching decision generator, and transmit the pre-buffered data to the buffer element of the current host to be stored.

The data processing system comprises a memory pool and at least one host. The memory pool is connected to the at least one host. Any host comprises a buffer element. The memory pool comprises a plurality of internal-memory devices. At least one of the plurality of internal-memory devices stores a buffer-prefetching decision generator.

In another aspect, the memory pool and the at least one host communicate by using multi-hierarchy interconnected CXL exchanging devices.

In another aspect, the at least one host is configured for:

identifying the CXL exchanging device that is connected to the memory pool and the current host, and determining the device number of the memory pool and the device number of the CXL exchanging device that is connected to the current host.

In another aspect, a single upstream physical port of any one of the CXL exchanging devices is virtualized into a plurality of upstream virtual ports, and each of the upstream virtual ports is connected to one host or a downstream physical port of the other CXL exchanging devices.

In another aspect, the memory pool further comprises an internal-memory controller; and the internal-memory controller is configured for:

addressing the memory pool in a unified mode, and storing an addressing table obtained by the addressing.

In another aspect, the internal-memory controller is configured for:

synchronizing the addressing table to the at least one host.

In another aspect, the internal-memory controller is configured for:

delimiting an internal-memory region of a single instance of the internal-memory devices in the memory pool into a plurality of internal-memory segments.

In another aspect, the internal-memory controller is configured for:

according to sizes of predetermined application-layer operations, delimiting the internal-memory region of the single internal-memory device in the memory pool into the plurality of internal-memory segments.

In another aspect, the internal-memory controller is configured for:

receiving a plurality of binding requests sent by different instances of the host, and according to the plurality of binding requests, binding the different instances of the internal-memory segments obtained by delimiting the internal-memory region of the single internal-memory device to the different hosts.

In another aspect, the internal-memory controller is configured for:

receiving a single binding request sent by any one instance of the host, and according to the single binding request, binding the internal-memory region of the single internal-memory device in the memory pool to the current host.

In another aspect, the at least one host is configured for:

generating an operation command based on the accessing request, and via the CXL exchanging device that is connected to the current host, sending the operation command to an internal-memory controller in the memory pool, whereby the internal-memory controller determines a target internal-memory device in the memory pool, and executes the operation command to the target internal-memory device.

In another aspect, the at least one host is configured for:

if has determined that the buffer element of the at least one host stores the target data, by the current host, based on the target data in the buffer element of the current host, responding to the accessing request.

In another aspect, the at least one host further comprises a buffer controller; and the buffer controller is configured for:

detecting whether the buffer element of the current host stores the target data.

In another aspect, the memory pool may implement the following function: inputting the accessing request and the physical addresses of the internal-memory devices in the memory pool into the buffer-prefetching decision generator, whereby the buffer-prefetching decision generator outputs a predicted physical address, and determines data stored in the predicted physical address to be the pre-buffered data. The memory pool may implement the following function: determining a delay time and a historical-reading-time average value that correspond to the predicted physical address, and according to the delay time and the historical-reading-time average value, determining a transmission time sequence of the pre-buffered data. The memory pool may implement the following function: determining a communication link between an instance of the internal-memory devices that the predicted physical address belongs to and an instance of the host that receives the accessing request, and counting up a link-hierarchy delay and a link-bandwidth delay of the communication link; and/or determining a device-performance delay of an instance of the internal-memory devices that the predicted physical address belongs to; and/or determining a region-performance delay of the predicted physical address in an instance of the internal-memory devices that the predicted physical address belongs to; and by using together the link-hierarchy delay, the link-bandwidth delay, the device-performance delay and/or the region-performance delay, obtaining the delay time that corresponds to the predicted physical address. The memory pool may implement the following function: detecting whether a hit rate of the pre-buffered data and/or a predicted physical address outputted by the buffer-prefetching decision generator are correct, and according to a corresponding detection result, determining an accuracy of the buffer-prefetching decision generator; and if the accuracy is less than a preset threshold, according to the detection result, optimizing the buffer-prefetching decision generator. The memory pool may implement the following function: by using a decision-tree classifier, detecting whether the hit rate of the pre-buffered data and/or the predicted physical address outputted by the buffer-prefetching decision generator are correct.

Some embodiments of the present application further disclose another data processing method, wherein the data processing method is applied to at least one host, and the at least one host is connected to a plurality of internal-memory devices. The at least one host comprises a buffer element. At least one of the plurality of internal-memory devices stores a buffer-prefetching decision generator. The method comprises: after the at least one host has received an accessing request, if the at least one host has determined that the buffer element of the at least one host does not store target data that the accessing request is to access, by the current host, transmitting the accessing request to the plurality of internal-memory devices, whereby the plurality of internal-memory devices respond to the accessing request, determine pre-buffered data by using the buffer-prefetching decision generator, and transmit the pre-buffered data to the buffer element of the current host to be stored.

Optionally, some embodiments of the present application further disclose another data processing method, wherein the data processing method is applied to a data processing system, and the method comprises: after at least one host has received an accessing request, if the at least one host has determined that a buffer element of the at least one host does not store target data that the accessing request is to access, by the current host, transmitting the accessing request to a plurality of internal-memory devices; and by the plurality of internal-memory devices, responding to the accessing request, by using a buffer-prefetching decision generator stored in at least one of the plurality of internal-memory devices, determining pre-buffered data, and transmitting the pre-buffered data to the buffer element of the current host to be stored. The at least one host is connected to the plurality of internal-memory devices, to together form the data processing system. The at least one host comprises the buffer element. At least one of the plurality of internal-memory devices stores the buffer-prefetching decision generator.

An electronic device according to some embodiments of the present application will be described below, and the electronic device described below and the other embodiments described herein may refer to each other. The electronic device according to the present embodiment may be any device or any apparatus according to the other embodiments, for example, the memory pool, the internal-memory devices, the host, the internal-memory controller and the buffer controller.

The electronic device according to some embodiments of the present application is configured for:

after has received an accessing request, if has determined that the buffer element of the at least one electronic device does not store target data that the accessing request is to access, by the current electronic device, transmitting the accessing request to the plurality of internal-memory devices, whereby the plurality of internal-memory devices respond to the accessing request, determine pre-buffered data by using the buffer-prefetching decision generator, and transmit the pre-buffered data to the buffer element of the current electronic device to be stored.

The electronic device according to some embodiments of the present application is configured for:

after determining the pre-buffered data by using the buffer-prefetching decision generator, compulsorily saving the pre-buffered data into the buffer element of the current electronic device; or after determining the pre-buffered data by using the buffer-prefetching decision generator, sending the pre-buffered data to the current electronic device, whereby the current electronic device saves the pre-buffered data into the buffer element of the current electronic device.

The electronic device according to some embodiments of the present application is configured for: identifying the plurality of internal-memory devices in the memory pool and the CXL exchanging device that is connected to the current electronic device, and determining the device numbers of the internal-memory devices in the memory pool and the device number of the CXL exchanging device that is connected to the current electronic device. The CXL exchanging devices refer to devices, such as an exchange, that communicate with the other sides via CXL.

The electronic device according to some embodiments of the present application is configured for: addressing the plurality of internal-memory devices in the memory pool in a unified mode, and storing an addressing table obtained by the addressing. Correspondingly, the electronic device is further configured for: synchronizing the addressing table to the at least one electronic device. Correspondingly, the electronic device is further configured for: delimiting an internal-memory region of a single instance of the internal-memory devices in the memory pool into a plurality of internal-memory segments. Correspondingly, the electronic device is further configured for: according to sizes of predetermined application-layer operations, delimiting the internal-memory region of the single internal-memory device in the memory pool into the plurality of internal-memory segments. Correspondingly, the electronic device is further configured for: receiving a plurality of binding requests sent by different electronic devices, and according to the plurality of binding requests, binding the different internal-memory segments obtained by delimiting the internal-memory region of the single internal-memory device to the different electronic devices. Correspondingly, the electronic device according to the present embodiment is configured for: receiving a single binding request sent by any one electronic device, and according to the single binding request, binding the internal-memory region of the single internal-memory device in the memory pool to the current electronic device.

The electronic device according to some embodiments of the present application is configured for:

generating an operation command based on the accessing request, and via the CXL exchanging device that is connected to the current electronic device, sending the operation command to an internal-memory controller in the memory pool, whereby the internal-memory controller determines a target internal-memory device in the memory pool, and executes the operation command to the target internal-memory device.

The electronic device according to some embodiments of the present application is configured for: if has determined that the buffer element of the at least one electronic device stores the target data, by the current electronic device, based on the target data in the buffer element of the current electronic device, responding to the accessing request. Any electronic device further comprises a buffer controller. The buffer controller is configured for: detecting whether the buffer element of the current electronic device stores the target data.

The electronic device according to some embodiments of the present application is configured for: inputting the accessing request and the physical addresses of the internal-memory devices in the memory pool into the buffer-prefetching decision generator, whereby the buffer-prefetching decision generator outputs a predicted physical address, and determines data stored in the predicted physical address to be the pre-buffered data. The buffer-prefetching decision generator is a multi-modality model, and the forms of its inputted data and outputted data may be different. The inputted data include the program counter (i.e., the accessing request) and the physical addresses of all of the internal memories (i.e., the physical addresses of the internal-memory devices in the memory pool). The outputted data include the physical address of the to-be-preread internal memory. Particularly, the buffer-prefetching decision generator may be embodied in the architecture of Transformer, wherein the input is a program-counter instruction, and the output is the physical address of the to-be-preread internal memory. Because the program counter and the physical address of the to-be-preread internal memory are in different forms, it is referred to as a multi-modality model. The program counter, by encoding operations, is transformed into data that the multi-modality model can identify, and is inputted into the multi-modality model, and the outputted result of the multi-modality model, by decoding operations, is transformed into a predicted internal-memory physical address. The multi-modality model is an artificial intelligence model, and can accurately comprehend the reading-writing actions of the program counter, which may highly increase the accuracy of the pre-buffering, to highly increase the accessing speed. Certainly, the buffer-prefetching decision generator requires occupying a large space, and is difficult to be placed at the electronic-device side.

The electronic device according to some embodiments of the present application is configured for: determining a delay time and a historical-reading-time average value that correspond to the predicted physical address, and according to the delay time and the historical-reading-time average value, determining a transmission time sequence of the pre-buffered data. Correspondingly, the memory pool is configured for: determining a communication link between the internal-memory device that the predicted physical address belongs to and the electronic device that receives the accessing request, and counting up a link-hierarchy delay and a link-bandwidth delay of the communication link; and/or determining a device-performance delay of an instance of the internal-memory devices that the predicted physical address belongs to; and/or determining a region-performance delay of the predicted physical address in an instance of the internal-memory devices that the predicted physical address belongs to; and by using together the link-hierarchy delay, the link-bandwidth delay, the device-performance delay and/or the region-performance delay, obtaining the delay time that corresponds to the predicted physical address.

The link-hierarchy delay is decided based on the length of the communication link between the internal-memory device and the electronic device that receives the accessing request. The link-bandwidth delay refers to the total bandwidth delay in communication-link. The device-performance delay is decided by the characteristics of the internal-memory device itself. The region-performance delay depends on the position of the predicted physical address in the internal-memory device, wherein the position is as shown by the region 1: MLD1, the region 2: MLD2, the region 3: MLD3 and the region 4: MLD4 in FIG. 4, and the different regions correspond to unequal region-performance delays.

The electronic device according to some embodiments of the present application is configured for: detecting whether a hit rate of the pre-buffered data and/or a predicted physical address outputted by the buffer-prefetching decision generator are correct, and according to a corresponding detection result, determining an accuracy of the buffer-prefetching decision generator; and if the accuracy is less than a preset threshold, according to the detection result, optimizing the buffer-prefetching decision generator. Correspondingly, the electronic device is further configured for: by using a decision-tree classifier, detecting whether the hit rate of the pre-buffered data and/or the predicted physical address outputted by the buffer-prefetching decision generator are correct.

Further, some embodiments of the present application further provide an electronic device. The electronic device may be the server shown in FIG. 8, and may also be the terminal shown in FIG. 9. Both of FIGS. 8 and 9 are structural diagrams of an electronic device according to an illustrative embodiment, and the contents in the figures should not be deemed as limiting the scope of the present application in any manner.

Figure 8:
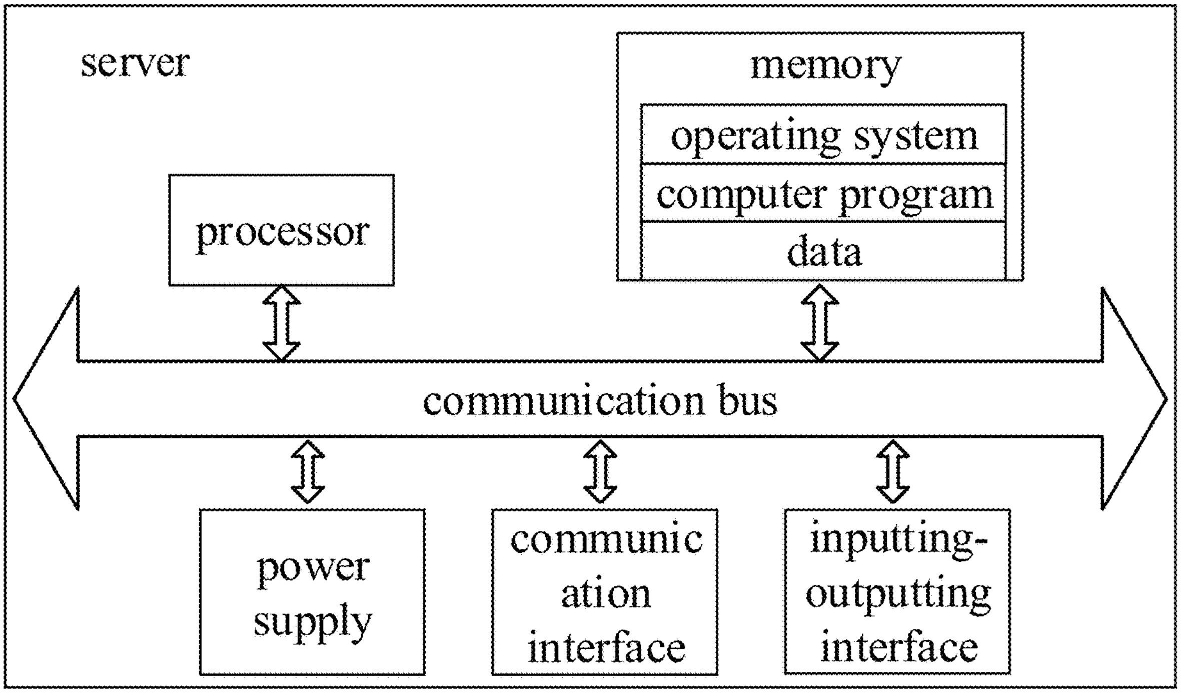
FIG. 8 is a structural diagram of a server according to some embodiments of the present application.
Figure 9:
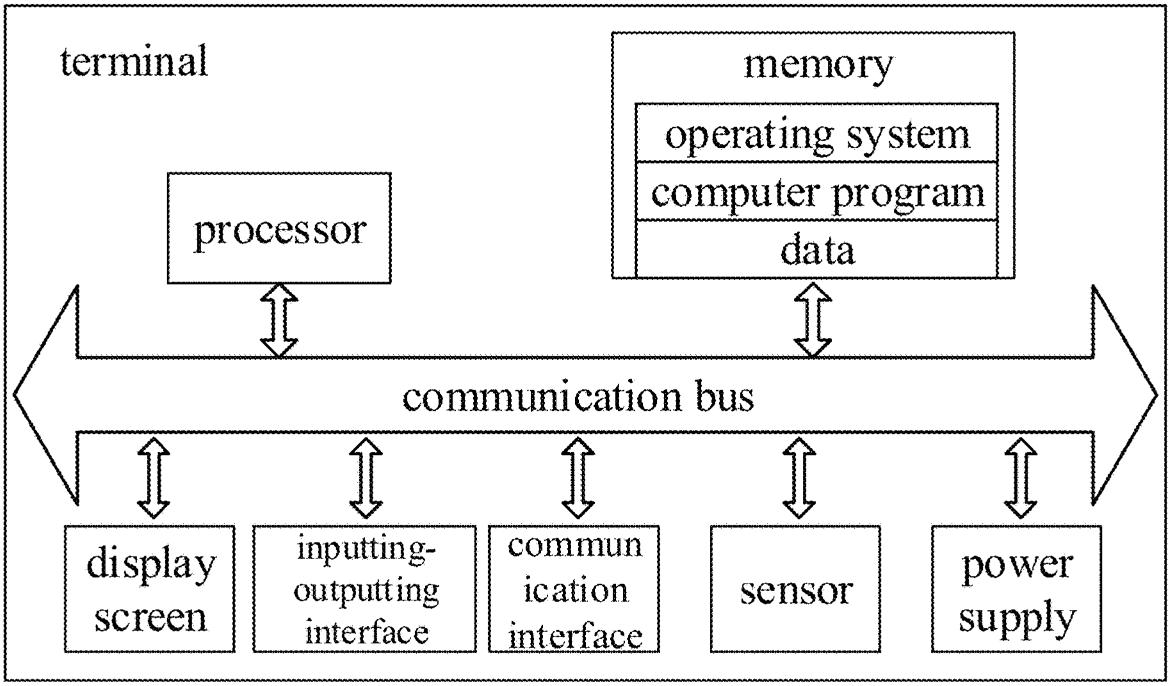
FIG. 9 is a structural diagram of a terminal according to some embodiments of the present application.

FIG. 8 is a schematic structural diagram of a server according to an embodiment of the present application. The server may particularly comprise at least one processor, at least one memory, a power supply, a communication interface, an inputting-outputting interface and a communication bus. The memory is configured for storing a computer program, and the computer program is loaded and executed by the processor to implement the relevant steps of the data processing method according to any one of the above embodiments.

In some embodiments of the present application, the power supply is configured for supplying an operation voltage to the hardware devices of the server. The communication interface can create a datum transmission channel between the server and an external device, and the communication protocol that it follows is any communication protocol that can apply to the technical solutions of the present application, and is not particularly limited herein. The inputting-outputting interface is configured for acquiring data inputted from the external or outputting data to the external, and its particular interface type may be selected according to particular application demands, and is not particularly limited herein.

In addition, the memory, as the carrier for the resource storage, may be a read-only memory, a random access memory, a magnetic disk, an optical disk and so on, the resource stored therein comprises an operating system, a computer program, data and so on, and the storage mode may be short-term storage or permanent storage.

The operating system is configured for managing and controlling the hardware devices and the computer programs in the server, to implement the operation and the processing of the data in the memory by the processor, and may be Windows Server (a server operating system), Netware (a network operating system), Unix (a multi-user multi-task operating system), Linux (an open-source Unix-type operating system) and so on. The computer program, besides comprising the computer program that can be configured for completing the relevant steps according to any one of the above embodiments, may further comprise computer programs that can be configured for completing other particular operations. The data may not only include the data such as the updating information of an application program, but also may include the data such as the developer information of an application program.

FIG. 9 is a schematic structural diagram of a terminal according to some embodiments of the present application. The terminal may particularly include but is not limited to a smartphone, a tablet personal computer, a notebook computer and a desktop computer.

Generally, the terminal according to some embodiments of the present application comprises a processor and a memory.

The processor may comprise one or more processing cores, for example, a 4-core processor and an 8-core processor. The processor may be embodied in at least one of the hardware forms of DSP (Digital Signal Processing), FPGA (Field-Programmable Gate Array) and PLA (Programmable Logic Array). The processor may also comprise a host processor and a co-processor. The host processor refers to a processor configured for processing the data in the awakening state, and is also referred to as a CPU (Central Processing Unit). The co-processor refers to a low-power-consumption processor configured for processing the data in the standby state. In some embodiments, the processor may be integrated with a GPU (Graphics Processing Unit), wherein the GPU is configured for rendering and drawing the contents that the display screen is required to display. In some embodiments, the processor may further comprise an AI (Artificial Intelligence) processor, wherein the AI processor is configured for processing the calculating operations related to machine learning.

The memory may comprise one or more non-volatile computer-readable storage mediums, wherein the non-volatile computer-readable storage mediums may be non-transient. The memory may further comprise a high-speed random access memory and a non-volatile memory, for example, one or more magnetic-disk storage devices and flash-memory storage devices. In the present embodiment, the memory is at least configured for storing the following computer program, wherein the computer program, after loaded and executed by the processor, can implement the relevant steps executed by the terminal side according to any one of the above embodiments. Additionally, the resources stored by the memory may further comprise an operating system, data and so on, wherein the storage mode may be short-term storage or permanent storage. The operating system may include Windows, Unix, Linux and so on. The data may include but are not limited to the information of the updating of application programs.

In some embodiments of the present application, the terminal may further comprise a display screen, an inputting-outputting interface, a communication interface, a sensor, a power supply and a communication bus.

A person skilled in the art can understand that the structure shown in FIG. 9 does not limit the terminal, and the terminal may comprise components more or fewer than those illustrated.

A non-volatile readable storage medium according to some embodiments of the present application will be described below, and the non-volatile readable storage medium described below and the other embodiments described herein may refer to each other. A non-volatile readable storage medium, wherein the non-volatile readable storage medium is configured for storing a computer program, and the computer program, when executed by a processor, implements the method according to any one of the above embodiments.

The embodiments of the description are described in the mode of progression, each of the embodiments emphatically describes the differences from the other embodiments, and the same or similar parts of the embodiments may refer to each other.

The steps of the method or algorithm described with reference to the embodiments disclosed herein may be implemented directly by using hardware, a software module executed by a processor or a combination thereof. The software module may be embedded in a Random Access Memory (RAM), an internal memory, a read-only memory (ROM), an electrically programmable ROM, an electrically erasable programmable ROM, a register, a hard disk, a removable disk, a CD-ROM, or a non-volatile readable storage medium in any other form well known in the art.

The principle and the embodiments of the present application are described herein with reference to the particular examples, and the description of the above embodiments is merely intended to facilitate to comprehend the method according to the present application and its core concept. Moreover, for a person skilled in the art, according to the concept of the present application, the particular embodiments and the range of application may be varied. In conclusion, the contents of the description should not be comprehended as limiting the present application.

The invention claimed is:

1. A data processing system, wherein the data processing system comprises a plurality of internal-memory devices and at least one host; and wherein the at least one host comprises a current host;

the plurality of internal-memory devices are connected to the at least one host;

the at least one host comprises a buffer element;

at least one of the plurality of internal-memory devices stores a buffer-prefetching decision generator; and the at least one host is configured for:

after has received an accessing request, in response to having determined that the buffer element of the at least one host does not store target data that the accessing request is to access, by the current host, transmitting the accessing request to the plurality of internal-memory devices, whereby the plurality of internal-memory devices respond to the accessing request, determine pre-buffered data by using the buffer-prefetching decision generator, and transmit the pre-buffered data to the buffer element of the current host to be stored;

wherein the at least one internal-memory device is configured for:

inputting the accessing request and physical addresses of the internal-memory devices into the buffer-prefetching decision generator, whereby the buffer-prefetching decision generator outputs a predicted physical address, and determines data stored in the predicted physical address to be the pre-buffered data;

wherein the at least one internal-memory device is configured for:

determining a delay time and a historical-reading-time average value that correspond to the predicted physical address, and according to the delay time and the historical-reading-time average value, determining a transmission time sequence of the pre-buffered data.

2. The system according to claim 1, wherein the at least one internal-memory device is configured for:

after determining the pre-buffered data by using the buffer-prefetching decision generator, compulsorily saving the pre-buffered data into the buffer element of the current host.

3. The system according to claim 1, wherein the at least one internal-memory device is configured for:

after determining the pre-buffered data by using the buffer-prefetching decision generator, sending the pre-buffered data to the current host, whereby the current host saves the pre-buffered data into the buffer element of the current host.

4. The system according to claim 1, wherein the plurality of internal-memory devices and the at least one host communicate by using multi-hierarchy interconnected CXL (Compute Express Link) exchanging devices.

5. The system according to claim 4, wherein the at least one host is configured for:

identifying the plurality of internal-memory devices and an instance of the CXL exchanging devices that is connected to the current host, and determining device numbers of the plurality of internal-memory devices and a device number of the CXL exchanging device that is connected to the current host.

6. The system according to claim 4, wherein a single upstream physical port of any one of the CXL exchanging devices is virtualized into a plurality of upstream virtual ports, and each of the upstream virtual ports is connected to one instance of the host or a downstream physical port of the other instances of the CXL exchanging devices.

7. The system according to claim 4, wherein the plurality of internal-memory devices form a memory pool, and the memory pool further comprises an internal-memory controller; and the internal-memory controller is configured for:

addressing the plurality of internal-memory devices in a unified mode, and storing an addressing table obtained by the addressing.

8. The system according to claim 7, wherein the internal-memory controller is configured for:

synchronizing the addressing table to the at least one host.

9. The system according to claim 7, wherein the internal-memory controller is configured for:

delimiting an internal-memory region of a single instance of the internal-memory devices in the memory pool into a plurality of internal-memory segments.

10. The system according to claim 9, wherein the internal-memory controller is configured for:

according to sizes of predetermined application-layer operations, delimiting the internal-memory region of the single internal-memory device in the memory pool into the plurality of internal-memory segments.

11. The system according to claim 9, wherein the internal-memory controller is configured for:

receiving a plurality of binding requests sent by different instances of the host, and according to the plurality of binding requests, binding the different instances of the internal-memory segments obtained by delimiting the internal-memory region of the single internal-memory device to the different hosts.

12. The system according to claim 9, wherein the internal-memory controller is configured for:

receiving a single binding request sent by any one instance of the host, and according to the single binding request, binding the internal-memory region of the single internal-memory device in the memory pool to the current host.

13. The system according to claim 4, wherein the at least one host is configured for:

generating an operation command based on the accessing request, via an instance of the CXL exchanging devices that is connected to the current host, sending the operation command to an internal-memory controller in a memory pool formed by the plurality of internal-memory devices, whereby the internal-memory controller determines a target internal-memory device in the memory pool, and executes the operation command to the target internal-memory device.

14. The system according to claim 1, wherein the at least one host is configured for:

in response to having determined that the buffer element of the at least one host stores the target data, by the current host, based on the target data in the buffer element of the current host, responding to the accessing request.

15. The system according to claim 1, wherein the at least one host further comprises a buffer controller; and the buffer controller is configured for:

detecting whether the buffer element of the current host stores the target data.

16. The system according to claim 1, wherein the at least one internal-memory device is configured for:

determining a communication link between an instance of the internal-memory devices that the predicted physical address belongs to and an instance of the host that receives the accessing request, and counting up a link-hierarchy delay and a link-bandwidth delay of the communication link; and/or determining a device-performance delay of an instance of the internal-memory devices that the predicted physical address belongs to; and/or determining a region-performance delay of the predicted physical address in an instance of the internal-memory devices that the predicted physical address belongs to; and by using together the link-hierarchy delay, the link-bandwidth delay, the device-performance delay and/or the region-performance delay, obtaining the delay time that corresponds to the predicted physical address.

17. The system according to claim 1, wherein the at least one internal-memory device is configured for:

detecting whether a hit rate of the pre-buffered data and/or a predicted physical address outputted by the buffer-prefetching decision generator are correct, and according to a corresponding detection result, determining an accuracy of the buffer-prefetching decision generator; and in response to the accuracy being less than a preset threshold, according to the detection result, optimizing the buffer-prefetching decision generator.

18. The system according to claim 17, wherein the at least one internal-memory device is configured for:

by using a decision-tree classifier, detecting whether the hit rate of the pre-buffered data and/or the predicted physical address outputted by the buffer-prefetching decision generator are correct.

19. A data processing method, wherein the data processing method is applied to at least one host, wherein the at least one host comprises a current host; and the at least one host is connected to a plurality of internal-memory devices;

the at least one host comprises a buffer element;

at least one of the plurality of internal-memory devices stores a buffer-prefetching decision generator; and the data processing method comprises:

after the at least one host has received an accessing request, in response to the at least one host having determined that the buffer element of the at least one host does not store target data that the accessing request is to access, by the current host, transmitting the accessing request to the plurality of internal-memory devices, whereby the plurality of internal-memory devices respond to the accessing request, determine pre-buffered data by using the buffer-prefetching decision generator, and transmit the pre-buffered data to the buffer element of the current host to be stored;

wherein the at least one internal-memory device is configured for:

inputting the accessing request and physical addresses of the internal-memory devices into the buffer-prefetching decision generator, whereby the buffer-prefetching decision generator outputs a predicted physical address, and determines data stored in the predicted physical address to be the pre-buffered data;

wherein the at least one internal-memory device is configured for:

determining a delay time and a historical-reading-time average value that correspond to the predicted physical address, and according to the delay time and the historical-reading-time average value, determining a transmission time sequence of the pre-buffered data.

20. A non-volatile readable storage medium, wherein the non-volatile readable storage medium is configured for storing a computer program, and the computer program, when executed by a processor, implements the method according to claim 19.

* * * * *